April 18, 1961 H. D. CRANE 2,980,892

MAGNETIC SWITCHING SYSTEMS

Filed June 27, 1956 2 Sheets-Sheet 1

INVENTOR.

Hewitt D. Crane

BY Morris Rabkin

ATTORNEY.

April 18, 1961 H. D. CRANE 2,980,892

MAGNETIC SWITCHING SYSTEMS

Filed June 27, 1956 2 Sheets-Sheet 2

INVENTOR.
Hewitt D. Crane
BY Morris Rahan
ATTORNEY.

United States Patent Office 2,980,892
Patented Apr. 18, 1961

2,980,892

MAGNETIC SWITCHING SYSTEMS

Hewitt D. Crane, Menlo Park, Calif., assignor to Radio Corporation of America, a corporation of Delaware Filed June 27, 1956, Ser. No. 594,176

16 Claims. (Cl. 340—174)

This invention relates to magnetic systems of the type which selectively produces output pulses.

Examples of some forms of magnetic systems of the type referred to are described in an article by Jan A. Rajchman entitled "Static Magnetic Matrix Memory and Switching Circuits," published in the RCA Review for June 1952. In operation, a first output is generated only when selecting signals are applied, and a second output during a subsequent restore operation. Thus, the switches of the systems do not utilize the "memory" property of the magnetic material in producing the first output.

Also, in certain magnetic switches, undesired "noise" signals are produced in the output circuit because the hysteresis characteristics of the cores are not perfectly rectangular.

Furthermore, in some magnetic switches, undesired flux changes may be produced in one core, due to the output current produced by a flux change in another core, if the output circuit is coupled to both the cores. These flux changes are undesired because there is a corresponding reduction in the amount of output that is obtained. Thus, the cores are not utilized to their full capacity.

It is among the objects of the present invention to provide an improved magnetic switching system wherein substantially no "noise" signals are produced.

Another object of the present invention is to provide an improved magnetic switching system for furnishing a sequence of opposite-polarity, symmetrical output signals.

A further object of the present invention is to provide a magnetic switching system improved in that the switch has memory characteristics.

A further object of the present invention is to provide an improved magnetic switching circuit for furnishing a sequence of symmetrical, opposite signals in response to a single-setting signal.

According to the invention, a magnetic system includes three or more flux paths which may be provided by three or more magnetic elements. An output circuit is linked to all of the elements, and two or more separate signal inputs are linked to certain ones of the elements. In a first operating condition, successive separate drive signals applied to separate ones of the signal inputs cause a sequence of opposite-polarity, symmetrical output signals in the output circuit. In a second operating condition, substantially no output signals are produced by the separate drive signals. The absence of output signals in the second operating condition is achieved by arranging the linkage of the signal inputs to the elements such that, in the second condition, any one drive signal causes outputs which effectively cancel each other. The system is changed from its second to its first operating condition by applying a setting signal to one of the signal inputs linking two of the elements. The system may be returned to its second response condition either by the successive drive signals or by separate restore signals.

In certain specific illustrative embodiments of the invention, individual magnetic cores of rectangular hysteresis loop material are used to provide the flux paths. In other illustrative embodiments of the invention, a multi-apertured core of rectangular hysteresis loop material is used to provide the flux paths.

The invention will be more fully understood from the following detailed description and the accompanying drawing wherein.

Figure 1:
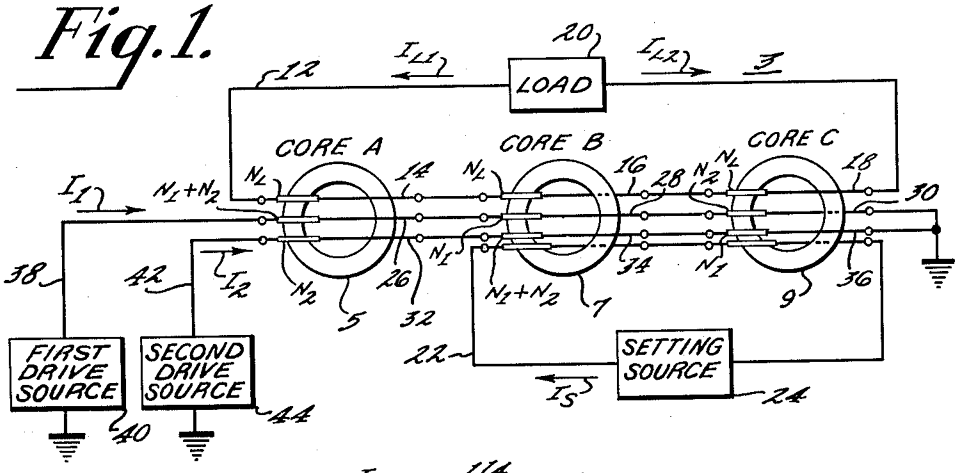
Fig. 1 is a schematic diagram of a switching system according to the invention, using three separate magnetic elements.

The switching system 3 of Fig. 1 has three separate magnetic elements 5, 7, and 9 designated as the cores A, B, and C, respectively. The cores A, B, and C are preferably, but not necessarily, toroidal in shape. The cores B and C are of rectangular hysteresis loop material. A suitable rectangular hysteresis material may be, for example, manganese-magnesium-ferrite material or molybdenum-Permalloy material. The core A may be either of rectangular hysteresis loop material, or of any known material having a linear magnetization characteristic, such as conventional transformer material.

Figure 2:
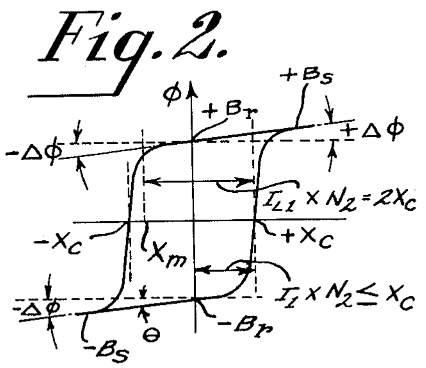
Fig. 2 is a graph, somewhat idealized, of a nearly rectangular hysteresis characteristic for a material which may be used in carrying out the invention.

A graph, somewhat idealized, of the flux ($\phi$) vs. magnetizing force (X) for a suitable rectangular hysteresis loop material is shown in Fig. 2 by the curve 10. The material has two remanent states and two corresponding saturated states. The two remanent states are referred to hereinafter as the $+B_r$ and the $-B_r$ states and are represented respectively by the points $+B_r$ and $-B_r$ on the flux ($\phi$) axis of the loop 10. The two corresponding saturated states are referred to hereinafter as the $+B_s$ and the $-B_s$ states and are represented respectively by the points $+B_s$ and $-B_s$ on the upper and lower horizontal portions respectively of loop 10. A flux change $\pm\Delta\phi$ is produced when the material is changed from remanence in one of the two states to saturation in the same state. In general, it is this latter small flux change that causes the undesired "noise" signals. Also, a magnetizing force (M.M.F.) corresponding to a coercive force of a value $X_m<X_c$ (where $X_c$ is the coercive force required to bring the material to the knee of the loop 10) causes a "loss" in the amount of remanent flux initially set in the material by a setting signal. This flux loss is undesired because, for example, the amount of output that can be obtained at a later time is correspondingly reduced and may result in unsymmetrical output signals. Both the undesired "noise" signals and the undesired "flux loss" are substantially eliminated in the systems of the present invention.

Referring again to Fig. 1, an output circuit 12 includes the output windings 14, 16 and 18, respectively, linked to the cores A, B, and C. A load device 20 may be connected across the output circuit 12. The load device 20 may be any suitable device responsive to signals induced in the output circuit 12. A setting means, which may be a setting winding 22, is linked to each of the cores B and C. The end terminals of the setting winding 22 are connected to a setting source 24. Separate first and second drive means are linked to each of the cores A, B, and C. The first drive means may be the separate first drive windings 26, 28, and 30 that are series-connected in a series circuit 38 and linked to the cores A, B, and C, respectively. The second drive means may be the separate second drive windings 32, 34, and 36 that are series-connected in a series-circuit 42 and linked to the cores A, B, and C, respectively. The series circuit 38 has one end terminal connected to an output of a first drive source 40, and the other end terminal connected to a common reference source, indicated in the drawing by the conventional ground symbol. The second series circuit 42 has one end terminal connected to a second drive source 44 and its other end terminal connected to the common ground. Each of the sources 40 and 44 has a second output terminal connected to the common ground.

Each of the windings is indicated by a rectangle about one side of the core, indicating a coil wrapping. The sense of linkage of a winding is indicated by whether the lead leaving the core passes over or under the core.

In operation, a cycle of the signals applied to the system may comprise, first, a set signal or the absence of a set signal; second, a first drive signal; and third, a second drive signal. The cycle may now be repeated as often as desired. If a set signal is applied, an output current $I_{L1}$ is delivered to the output circuit 12 at the first drive time, and an opposite polarity output $I_{L2}$ is delivered to the output circuit 12 at the second drive time. If the set signal is absent, no output is delivered to the output circuit 12 at either of the drive times.

The system is placed in its set condition by activating the setting source 24 to apply a set current $I_s$ to the setting coil 22, in the direction of the reference arrow. The arrows adjacent any of the various coils represent the currents therein and indicate also the direction of positive, conventional flow of this current in the circuit. This convention is adopted throughout the application. After the setting current $I_s$ is applied, each of the cores B and C is at (that is, in a state represented by) its $+B_r$ remanent point. The flux changes in the cores B and C induce opposite-polarity voltages in the output windings 16 and 18 respectively linked to the cores B and C. These opposite-polarity voltages tend to cancel each other. Substantially no output signal flows in the output circuit 12, when the system is placed in its set condition, if the setting coil 22 couples to both cores B and C with the same number of turns and if the output windings 16 and 18 have the same number of turns $N_L$ on both cores. Thus, when both cores B and C are set to their $+B_r$ states, substantially equal amplitude and opposite-polarity cancelling voltages are induced in the output windings 16 and 18 of the cores B and C.

The first drive source 40 is then activated to apply a first drive current $I_1$ to the first drive circuit 38. The first drive current $I_1$ changes the state of the core B from that represented by the remanent state $+B_r$ along the left branch of the loop 10 (Fig. 2) to that represented by the saturation state $-B_s$. Upon termination of the first drive current $I_1$ the state of the core B is represented by its remanent state $-B_r$. The flux change in the core B causes an output current $I_{L1}$ to flow in the output circuit 12. Neglecting the core A for the moment, note that the output current $I_{L1}$ flows through the output winding 18 of the core C in a direction to change it from its $+B_r$ remanent state towards its $-B_s$ saturated state along the left branch of the loop 10 (Fig. 2). A reduction in the remanent flux of the core C is undesirable because the amount of output signal delivered to the load would be correspondingly reduced. This reduction is prevented by using the first drive current $I_1$ to buck the load current $I_{L1}$. Thus, the first drive current $I_1$ also flows in the first drive winding 30 of the core C and is in a direction to oppose the action of the load current $I_{L1}$. To prevent any flux reduction in the core C, the first drive winding 30 is made to link the core C with a number of turns $N_2$ such that the M.M.F. $I_1N_2$ reduces the M.M.F. due to the output current $I_{L1}$ to a value less than the coercive force $-X_c$ required to change the remanent state of the core C, or $$(1) \qquad I_{L1}N_L - I_1N_2 \leq X_c$$

For reasons described hereinafter, the bucking M.M.F. $I_1 \times N_2$ applied to the core C preferably is made less than the coercive force $X_c$. Thus, the M.M.F. generated by the output current $I_{L1}$ can have a value of $$(2) \qquad I_{L1} \times N_L \leq 2X_c$$

without producing any appreciable flux reduction in the core C, as indicated on the curve 10 of Fig. 2.

Activation of the second drive source 44 causes a second drive current $I_2$ to flow in the second input circuit 42. The second drive current $I_2$ flowing in the second drive winding 36 of the core C drives the core C from its $+B_r$ remanent state to its $-B_s$ saturation state.

Upon termination of the second drive current $I_2$ the core C returns to its $-B_r$ remanent state. When the core C is thus driven by the second drive current $I_2$, a load current $I_{L2}$ is induced in the output circuit 12. The load current $I_{L2}$ may be the same amplitude as, and is of the polarity opposite from, the load current $I_{L1}$. Again neglecting the core A, note that the load current $I_{L2}$ is in a direction to change the more B from its $-B_r$ remanent state to its $-B_s$ saturation state. However, the core B also returns substantially to its $-B_r$ remanent state upon termination of the load current $I_{L2}$. Accordingly, in the set condition, a sequence of a first and a second drive current induces a sequence of equal amplitude and opposite-polarity output currents in the load circuit 12.

The system 3 is now in the second response condition, in which both the cores B and C are in their $-B_r$ remanent conditions. The second response condition corresponds to the absence of a setting signal and no outputs are produced in the output circuit 12 at the first and second drive times. When a first drive current $I_1$ is applied, the core B is driven from its $-B_r$ remanent state to its $-B_s$ saturation state, and the core C is driven from its $-B_r$ remanent state towards its $+B_s$ saturation state. The voltages induced in the output circuit 12 by the cores B and C are additive due to the connections of their output windings 16 and 18, respectively. If uncompensated, there would be a net voltage across the output circuit 12 and a "noise" signal would be produced. The dummy core A is used to cancel this "noise" signal by arranging the linkages of its output winding 14 and its first drive winding 26 such that a cancelling voltage is induced in its output winding 14 at first drive time. The first drive current $I_1$ flows in the first drive winding 26 of the core A and drives the core A towards its negative direction of saturation. The output winding 14 of the core A, for example, may have the same number of turns $N_L$ as the output windings on the cores B and C. In such case, the first drive winding 26 is made to link the core A with a number of turns $(N_1+N_2)$ equal to the sum of the turns $N_1$ and $N_2$ of the first drive windings 28 and 30 on the cores B and C, respectively. Accordingly, the magnetization of the core A is changed by an amount equal to the sum of the changes of magnetization of the cores B and C.

For example, for complete compensation the following relation is satisfied:

$$(3) \qquad [K(N_1+N_2)I_1]N_L=[KN_AI_1]N_{LA}$$

where K is equal to tan $\theta$ (Fig. 2) and where $N_A$ and $N_{LA}$ are respectively the number of turns of the first drive winding 26 and the output winding 14 on the core A. Conveniently, $N_A$ is equal to $(N_1+N_2)$ and $N_{LA}$ is equal to $N_L$. The left side of Equation 3 represents the total flux change in the cores B and C due to the first drive current $I_1$, and the right side of Equation 3 represents the flux change in the core A due to the first drive current. Accordingly, in the second response condition of the system of Fig. 3, there is substantially no output induced in the output circuit 12 as a result of the first drive current $I_1$. For substantially perfect compensation, the M.M.F. $N_1 \times I_1$ acting on core C is limited to the value $-X_m$ (Fig. 2) at which the slope of the upper horizontal portion of the curve 10 begins to change. Thus, the value of tan $\theta$ is the same for the cores A, B and C.

Observe that, in the set condition, the load current $I_{L2}$, flowing in the output winding 14 of the core A, tends to drive the core A towards its positive direction of saturation. The net M.M.F. acting on the core A at the second drive time can be made substantially equal to zero by arranging the second drive winding 32 of the core A such that, $$(4) \qquad I_2N_2 \leqq -X_c$$

and, as described in connection with Equation 1, if the core A is of rectangular loop material, the M.M.F. $I_{L2} \times N_2$ can have a value of up to $+2X_c$ without changing the remanent state of the core A during the second drive time. However, in the second response condition, the second drive current $I_2$ drives both the cores A and C towards their negative states of saturation and the resulting flux changes cause additive "noise" voltages to be induced in the output circuit 12. These "noise" voltages can be cancelled by also linking the second drive circuit to the core B and arranging the second drive winding 34 of the core B such that a cancelling voltage is induced in its output winding 16. Thus, the number of turns of the second drive winding 34 of the core B is made equal to the sum of the turns of the second drive windings 32 and 36 for the cores A and C, respectively. Consequently, at the second drive time substantially no output is induced in the output circuit 12 when both the cores B and C are in their $-B_r$ remanent states.

Thus, in the system of Fig. 1, there are two separate response conditions. In one response condition bi-directional symmetrical outputs are induced in the output circuit 12; in the other response condition, substantially no outputs are induced in the output circuit 12. Note that the core A is not driven from one to the other states of remanence, but is a dummy core used only to cancel undesired outputs. Thus, the core A may be of linear magnetic material whose magnetization characteristic has approximately the same slope as that of the horizontal portions of the curves 10 (Fig. 2) for the cores B and C.

Figure 3:
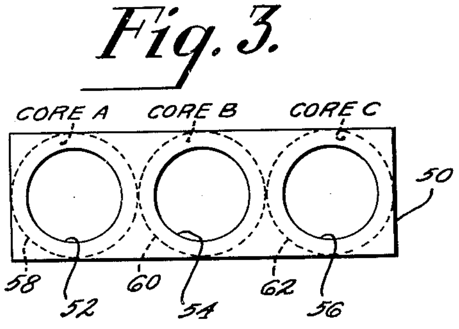
Fig. 3 is a schematic diagram of a multi-apertured core which may be used in place of the separate elements of the system of Fig. 1.

The three individual cores A, B, and C of the system of Fig. 1 may be provided in a single plate 50 of rectangular hysteresis loop material, as shown in Fig. 3. The plate 50 has three substantially equal apertures 52, 54 and 56 to provide three separate flux paths 58, 60, and 62, respectively indicated by the dotted circles, each of these flux paths being taken about a separate one of the apertures. The magnetic material included in the flux paths defines respectively the magnetic cores A, B, and C. The individual windings of the system of Fig. 1 may be linked to the cores A, B, and C of Fig. 3 in a manner similar to that described for the system of Fig. 1. A single plate of material may be advantageous, for example, in compactness.

Consider, now, the operation of the system of Fig. 1, when the cores B and C are set to their $+B_r$ remanent states, and a second drive current $I_2$ is applied in the absence of a prior first drive current $I_1$. The second drive current $I_2$, flowing in the second drive windings 34 and 36 of the cores B and C, operates to drive both these cores from the $+B_r$ to the $-B_r$ states of remanence. The flux changes in the cores B and C cause substantially equal and opposite voltages to be induced in their output windings 16 and 18. Thus, practically no output signal is induced in the output circuit 12, and the system is automatically returned to its reset condition without requiring an opposite-polarity current to flow in its setting coil 22. The second drive current $I_2$, flowing in the second drive coil 32 of the dummy core A, causes a voltage to be induced in its output winding 14. This induced voltage is in a direction to aid the voltage induced in the output winding 18 of the core C. Observe, however, that the flux in the core B tends to change at a faster rate than that of the core C, due to the larger M.M.F. $I_2 \times (N_1+N_2)$ applied to the core B. Thus, the magnitude of the output voltage of the core B tends to be larger than that of the core C. The additional increment of voltage produced by the core B is partially compensated for by the cancelling voltage produced in the output circuit by the dummy core A. Thus, if the number of turns $N_2$ is much smaller, say five times smaller, than the number of turns $N_1$, then substantially no output is produced in the output circuit 12 when the system 3 is reset by a second drive current $I_2$. If both cores B and C are not previously set, then a second drive current $I_2$, applied before a first drive current $I_1$, does not produce any output because the "noise" voltage produced by the core B is cancelled by the "noise" voltages produced by the cores A and C. The feature of automatic reset can be very advantageous in combinatorial systems because the second drive current can then be applied without regard to whether or not previous set or first drive pulses have been applied.

Figure 4:
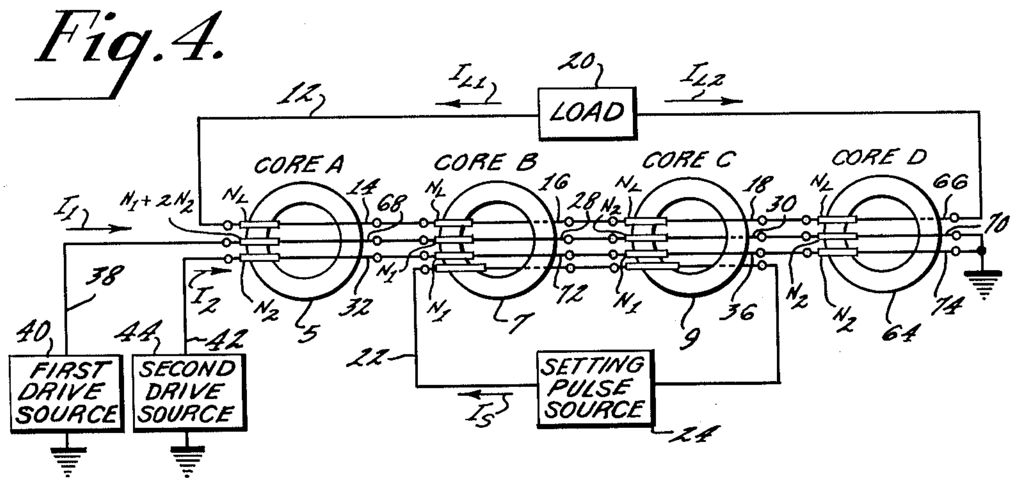
Fig. 4 is a schematic diagram of a system according to the invention, using four separate magnetic elements.

Substantially complete compensation can be obtained for any "undesired" output, during the automatic reset, by using four separate cores, as in the system of Fig. 4. The fourth core 64 of the system of Fig. 4, hereinafter referred to as the core D, is also a dummy core; that is, the core D, like the core A of the system of Fig. 1, is not driven between the two states of saturation but is used only to compensate for undesired output signals. The core D may be of rectangular hysteresis loop material, or it may be of linear magnetic material. The core A now compensates for the "noise" voltages induced in the output circuit 12 by the cores B, C and D when the first drive current $I_2$ is applied when the system is in its reset condition. Thus, the first drive winding 68 is coupled to the core A by a number of turns $(N_1+2N_2)$. Each of the output windings 14, 16, 18, and 66 of the cores A, B, C, and D, respectively, may have the same number of turns $N_L$ on each of these cores. The first drive winding 70 on the core D is used to prevent flux changes in the core D due to the load current $I_{L1}$ flowing in its load winding 66. The second drive winding 74 on the core D is used to compensate for undesired "noise" signals induced in the output circuit 12 during the application of a second drive current $I_2$ when the system is in its reset condition. Thus, the voltages induced in the output circuit 12 by the cores A and C are opposed by the substantially equal voltages induced in the output circuit 12 by the cores B and D.

Observe that the cores B and C are each driven at substantially the same rate by a second drive current $I_2$. Thus, a second drive current generates substantially the same M.M.F. of $I_2 \times N_1$ for each of the cores B and C. Likewise, a substantially equal M.M.F. $I_2 \times N_2$ acts on the cores A and D during the second drive operation. Consequently, substantially complete cancellation of the output voltages is produced in the output circuit 12 when both the cores B and C are returned to their reset condition by a second drive current $I_2$.

Figure 5:
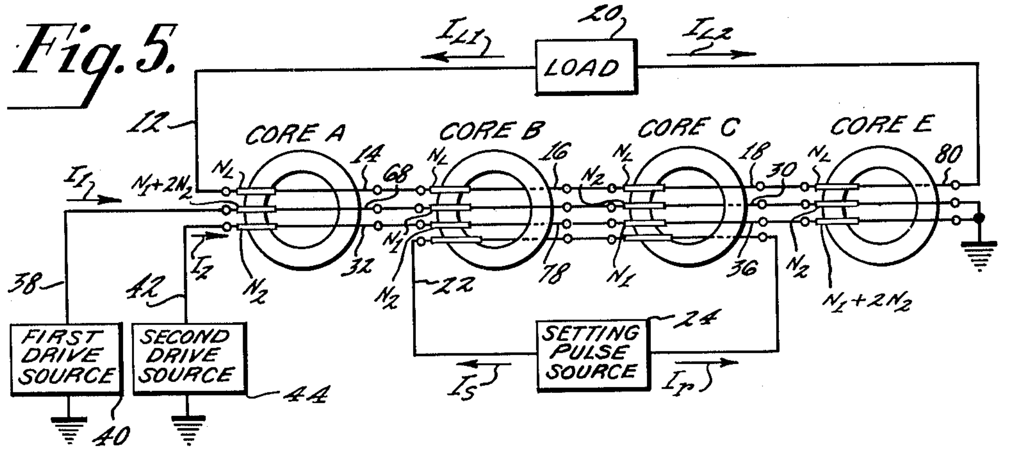
Fig. 5 is a schematic diagram of a system according to the invention, using four separate magnetic elements and differing from the system of Fig. 4 in the manner of linking the windings to the elements.

A system, according to the invention, that can be operated with an arbitrary sequence of drive signals, is shown in Fig. 5. The system of Fig. 5 is similar to that of Fig. 1 except that a fourth core 76 is added and a different number of turns $(N_1+2N_2)$ are used for the first drive winding 68 of the core A and a different number of turns ($N_2$) are used for the second drive winding 78 of the core B. Also, the sense of linkage of the second drive winding 78 is opposite from that of the second drive winding 72 of the core B in the system of Fig. 4, as described hereinafter. The fourth core 76 is also a dummy core and is designated hereinafter as the core E. The core E also may be of rectangular hysteresis loop material or of linear magnetic material. The first and second drive windings are wound symmetrically with respect to each other on the cores B and C and on the cores A and E; that is, the first and second drive windings 68 and 32 of the core A have, respectively, $(N_1+2N_2)$ and $N_2$ turns, while the first and second drive windings 70 and 74 of the core E have, respectively, $N_2$ and $(N_1+2N_2)$ turns. The first and second drive windings 28 and 78 of the core B have, respectively, $N_1$ and $N_2$ turns, while the first and second drive windings 30 and 36 of the core C have, respectively, $N_2$ and $N_1$ turns. Each of the load windings 14, 16, 18, and 80 of the cores A, B, C, and E may have the same number of turns $N_L$.

In operation, in the reset condition, the output voltage of the core A is used to cancel the "noise" voltages produced in the output circuit 12 by the cores B, C, and E when a first drive current $I_1$ is applied, as described for the system of Fig. 5. The output voltage of the core E is used to cancel the "noise" voltages produced in the output circuit 12 by the cores A, B, and C when a second drive current $I_2$ is applied. The first and second drive currents $I_1$ and $I_2$ may be applied successively in any order.

In the set condition, the second drive winding 78 on the core B is wound in a sense to prevent any flux changes in the core B due to the application of a second drive current $I_2$ prior to the first drive current $I_1$. The second drive current $I_2$ changes the core C from the $+B_r$ to the $-B_r$ remanent state. The flux change in the core C causes the load current $I_{L2}$ which is in a direction to change the core B from the $+B_r$ to the $-B_r$ state. The M.M.F. produced by the second drive current $I_2$ in the second drive winding 78 of the core B prevents any appreciable flux change in the core B. Similarly, the first drive winding 30 of the core C prevents the load current $I_{L1}$ from changing flux in the core C when the first drive current $I_1$ precedes the second drive current $I_2$.

Thus, a sequence of pairs of successive, opposite-polarity, symmetrical outputs, in either order, can be obtained by using four individual cores and arranging the various windings of the cores to compensate against any undesired flux changes in the cores. By following each pair of drive signals with a new setting signal, an arbitrary sequence of pairs of outputs can be obtained in any order, i.e., $I_{L1}$ and $I_{L2}$, or vice versa for any one setting signal.

The system of Fig. 5, however, does not provide for the automatic reset operation, as do the systems of Figs. 1 and 4, because the second drive current is in a direction to drive the core B further into saturation in the $+B_s$ state. The system of Fig. 6 can be reset by applying a reset current $I_r$ to the setting coil 22. The reset current $I_r$ changes both the cores B and C from the $+B_r$ to the $-B_r$ remanent state. Again, substantially no output is produced when the system of Fig. 5 is reset. If desired, a separate reset coil (not shown) may be linked to the cores B and C for receiving the reset current $I_r$.

The individual toroids of the systems of Figs. 4 and 5 can also be replaced by a single plate (not shown) of substantially rectangular hysteresis loop material having four apertures, and four separate flux paths, as described for the three-apertured plate 50 of Fig. 3.

In each of the above systems, only a single pair of symmetrical outputs are obtained for each set signal; that is, the information represented by a prior set signal is destroyed in the process of obtaining the pair of output signals. An indefinitely long "memory" can be provided by utilizing "transfluxor" cores and arranging the triplet or quadruplet of cores to be a part of the transfluxor core. Transfluxor systems have been described in an article entitled "The Transfluxor," by Jan A. Rajchman and A. W. Lo, in the Proceedings of the I.R.E., March 1956, pages 321–332.

Figure 6:
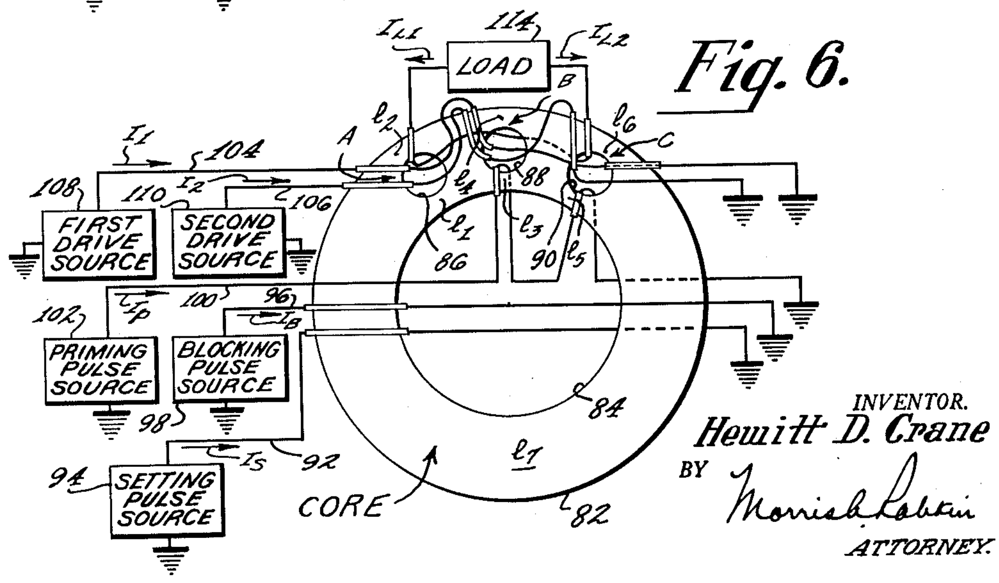
Fig. 6 is a schematic diagram of another multi-apertured core having a central aperture and three relatively smaller apertures, and which may be used in place of the separate elements of the system of Fig. 1.

Referring to Fig. 6, a transfluxor core 82 has a relatively large inner aperture 84 and three other apertures 86, 88, and 90 centered in the material between the inside surface of the inner aperture 84 and the periphery of the transfluxor core 82. The portions of material about the three apertures 86, 88 and 90 provide three separate flux paths. These portions of material correspond to the three cores A, B and C of Fig. 1. The minimum transverse cross-sectional areas of the material between the inside surfaces of each of the three apertures 86, 88 and 90, and the inside surface of the larger aperture 84, are made substantially equal to each other. Likewise, the minimum transverse cross-sectional areas of material between each of the three apertures 86, 88 and 90, and the periphery of the transfluxor core 82, are made substantially equal to each other. The minimum transverse cross-sectional area of material of the transfluxor core 82, at any point between its inside surface and its periphery, is made equal to, or greater than, the sum of the minimum, transverse cross-sectional areas of material of any one of the cores A, B, and C. The legs at which the minimum cross-sectional areas of the core A occur are designated as the legs $l_1$ and $l_2$. The legs at which the minimum cross-sectional areas of the core B occur are designated as the legs $l_3$ and $l_4$; and, the legs at which the minimum cross-sectional areas of the core C occur are designated as the legs $l_5$ and $l_6$. The leg at which the minimum cross-sectional area of the transfluxor core 82 occurs is designated as the leg $l_7$.

A setting winding 92 and a blocking winding 96 are each linked to the transfluxor core 82 through its larger aperture 84. The setting winding is connected at one end to a setting pulse source 94, and at its other end to the common ground. The blocking winding 96 is connected at one end to a block pulse source 98 and at its other end to the common ground. A priming winding 100 may be linked to both the cores B and C by being wound on the respective legs $l_3$ and $l_5$ of these cores. One end of the priming winding 100 is connected to a priming pulse source 102, and the other end is connected to the common ground. A first and a second drive winding 104 and 106 are each threaded through the cores A, B, and C of the transfluxor core 82. The first drive winding 104 has one end terminal connected to a first drive source 108 and has its other end terminal connected to the common ground. The second drive winding 106 has one end terminal connected to a second drive source 110 and has its other end terminal connected to the common ground. A load winding 112 is threaded through each of the cores A, B, and C of the transfluxor core 82. A load device 114 is connected across the load winding 112. The relation between the linkage of the first and second drive windings 104 and 106, and the output winding 112 in each of the cores A, B, and C, is similar to that described for the system of Fig. 1.

The operation of the system of Fig. 6, insofar as the blocking, the setting, and the priming operations are concerned, is essentially the same as that described in the above-mentioned Rajchman and Lo article. A blocking current $I_B$ orients the flux in the counterclockwise sense about the aperture 84, as viewed in the drawing, in all portions of the transfluxor core 82. In the blocked condition, substantially no output is induced in the output circuit by a priming current $I_p$, or either one of the first and second drive currents $I_1$ and $I_2$. A setting current $I_s$ changes the flux in the legs $l_1$, $l_3$, $l_5$, and a portion of the leg $l_7$ from the counterclockwise to the clockwise sense. A succeeding priming current $I_p$ changes the flux in the cores B and C from the counterclockwise sense to the clockwise sense. A succeeding first drive current $I_1$ reverses the flux in the core B from the clockwise to the counterclockwise sense, thereby producing the load current $I_{L1}$ in the output winding 112. The load current $I_{L1}$ is prevented from changing the flux in the core C by the first drive current $I_1$ which flows at the same time through the core C. A succeeding second drive current $I_2$ reverses the flux in the core C from the clockwise to the counterclockwise sense, thereby producing the opposite-polarity, symmetrical load current $I_{L2}$ in the output winding 112. A new priming current $I_p$ reverses the flux in the cores C and B back to the clockwise sense, and subsequent first and second drive currents $I_1$ and $I_2$ produce corresponding load currents $I_{L1}$ and $I_{L2}$ in the output circuit. A continuous sequence of alternating load currents can be obtained by repeating the sequence of a prime, a first drive, and a second drive current. The "memory" is furnished by the changed portion of the leg $l_7$ which remains set until a new blocking current $I_B$ is applied.

The core A again serves as a dummy core, as in the triplet of cores described for the systems of Figs. 1 and 3. The flux in the leg $l_2$ adjacent the core A is always in the counterclockwise sense. In the blocked condition, the "noise" output produced by the cores B and C at the first drive time is cancelled by the opposite-polarity output produced by the core A; the "noise" output produced by the cores A and C at the second drive time is cancelled by the opposite-polarity output produced by the core B.

Increased output can be obtained by using more complicated compensation arrangements, as described in a copending application filed by the present applicant on May 7, 1956, Serial No. 582,985, entitled "Magnetic Systems."

Also, the analog property of a transfluxor system, described by Rajchman and Lo in the aforementioned article, can be obtained in the system of Fig. 6. Thus, by varying the amplitude of the setting current $I_s$, the amount of output obtained at first and second drive times is proportional to the initial setting current.

Figure 7:
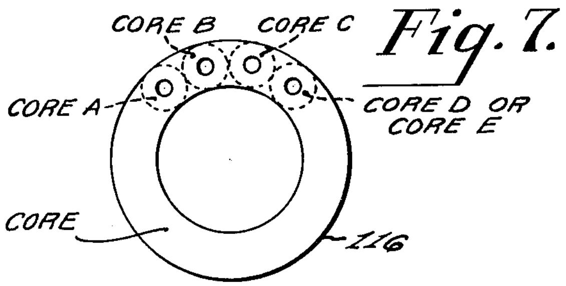
Fig. 7 is a schematic diagram of a multi-apertured core having an inner aperture and four relatively smaller, outer apertures, and which may be used in place of the separate magnetic elements of the systems of Figs. 5 and 6.

The system of Fig. 7 uses four apertures centered about the central aperture of a transfluxor core 116. The portions of material about the four apertures 118, 120, 123, and 124 provide separate flux paths indicated as the cores A, B, C, D or E. The first and second drive windings and the output windings may be threaded through the cores A, B, C, and E in a manner similar to that of the system of Fig. 5. The setting, the blocking, and the priming windings may be linked through the central aperture of the transfluxor core 116 in the manner in which their like windings are threaded through the apertures of the transfluxor core 82, described in the system of Fig. 6.

Also, the first and second drive windings and the output winding may be threaded through the cores A, B, C and D in the manner described for these windings in the system of Fig. 4. The blocking, setting and priming windings may be threaded through the apertures of the transfluxor core 116 in the manner described for the like windings in the system of Fig. 6.

The automatic reset feature of the systems of Figs. 1 and 4 is not applicable in a system using a transfluxor core, for example that of Fig. 6, because the second drive current $I_2$ affects only the cores B and C and does not cause a flux change in the distant leg $l_7$. The system of Fig. 6 is returned to its blocked condition by applying a new blocking signal $I_B$ to the blocking coil 96.

There have been described herein improved magnetic switching systems for obtaining symmetrical bi-polarity output signals. These systems include either a triplet or a quartet of individual toroids or plates of material having three or more apertures in the plate. A memory function may be achieved by using transfluxor cores.

What is claimed is:

1. A magnetic system for producing successive symmetrical signals of opposite polarities comprising magnetic material having apertures and having three flux paths in said magnetic material, said flux paths each being taken about a different aperture in said material, the material of a first and a second of said three paths having a substantially rectangular hysteresis loop and having two remanent states, means to set the flux in both said first and second paths to one of said remanent states, an output circuit linking all said paths such that said output circuit has a signal produced therein only when the flux in said first and second paths are separately driven from one to another of said states, a first means linking each of said three paths for driving the flux in said first path from a first remanent state to the other remanent state, said first means causing a cancelling voltage to be produced in said output circuit as a result of a flux change in said third path, and a second means linking each of said three paths for driving said second path from said one remanent state to the other remanent state, said second means causing a cancelling voltage to be produced in said output circuit as a result of a flux change in said first path.

2. A magnetic system as recited in claim 1, including three separate cores of magnetic material, each of said apertures being in a different one of said cores.

3. In a magnetic system for producing successive symmetrical signals of opposite polarities, the combination comprising four flux paths in magnetic material, each said path being taken about a different aperture in said material, the material of a first and a second of said paths having a substantially rectangular hysteresis loop, an output circuit linking each of said paths such that said output circuit has a signal induced therein only when said first and second paths are separately driven, a setting circuit linking a portion of said material in each of said first and second paths, first and second windings separately linking each of said paths, said first winding on said third path causing a cancelling signal in said output circuit when a signal is applied to said first windings, and said second winding on said first and fourth paths causing cancelling signals in said output circuit when a signal is applied to said second windings.

4. In a magnetic system, the combination as claimed in claim 3, including a plate of substantially rectangular hysteresis loop material having a plurality of apertures therein.

5. In a magnetic system, the combination as claimed in claim 3, including a plate of substantially rectangular hysteresis loop material having an inner aperture and four other apertures in said material, each of said four paths being defined by the portion of material about a different one of said four apertures, each of said four paths having different remanent states, and means including winding means linked to said material through said inner aperture for changing the remanent states of said four paths.

6. A magnetic system, comprising four individual flux paths in magnetic material, each of said paths being taken about a different aperture in said material, the material of a first and a second of said paths having a substantially rectangular hysteresis loop and having two remanent states, winding means linked to said paths for establishing the flux in said first and second paths in desired ones of said states, an output circuit linking each of said paths such that said output circuit has a signal induced therein only when said first and second paths are separately driven from one to the other of said states, a first winding linking each of said paths, said first winding linkage to a third of said paths being arranged to cause a cancelling signal in said output circuit when a signal is applied to said first windings, a second winding linking each of said paths, said second winding linkage to a fourth of said paths being arranged to cause a cancelling signal in said output circuit when a signal is applied to said second windings.

7. In a magnetic system, the combination as claimed in claim 6, including a plate of substantially rectangular hysteresis loop material having apertures therein.

8. In a magnetic system, the combination as claimed in claim 6, said first and second paths each having two remanent states, means to set said first and second paths to a first of said remanent states, said second signal operating to return both said first and second paths to the other of said remanent states in the absence of a prior first signal.

9. A magnetic system, comprising three flux paths in magnetic material, the material of a first and a second of said paths having a substantially rectangular hysteresis loop, each of said paths being taken about a different aperture in said material, an output circuit linked to each of said paths, a different first winding linked to each of said paths, means connecting said first windings in series with each other in a first input circuit, a different second winding linking each of said paths, means connecting said second windings in series with each other in a second input circuit, a setting circuit linking a portion of said material in each of said first and second paths, and separate means for applying signals to said first and second input circuits respectively, said first winding of said second path causing a cancelling signal in said output circuit when a signal is applied to said first input circuit, said second winding of said first path causing a cancelling signal in said output circuit when a signal is applied to said second input circuit.

10. In a magnetic system, the combination comprising a transfluxor core of substantially rectangular hysteresis loop material having a relatively central aperture and three relatively outer apertures in said material, an individual flux path in said material about each of said apertures, an output circuit linked through each of said outer apertures, a different first winding linked through each of said outer apertures, said first windings being connected in series with each other in a first input circuit, a different second winding linked through each of said outer apertures, said second windings being connected in series with each other in a second input circuit, separate blocking and setting windings linked through said central aperture for changing said transfluxor core to its blocked and set conditions, respectively, and separate means for applying signals to said first and second input circuits respectively, said first winding of one of said outer apertures causing a cancelling signal in said output circuit when a signal is applied to said first input circuit, and said second winding of another of said output apertures causing a cancelling signal in said output circuit when a signal is applied to said second input circuit.

11. In a magnetic system, the combination as claimed in claim 10, including a further winding wound on said core through said central and through a pair of said outer apertures.

12. A magnetic system for producing successive symmetrical signals of opposite polarities comprising a single plate of substantially rectangular hysteresis loop magnetic material having a plurality of apertures therein, three flux paths in said material, said flux paths each being taken about a different one of said apertures, said material having two remanent states, means to set the flux in both said first and second paths to one of said remanent states, an output circuit linking all said paths such that said output circuit has a signal produced therein only when the flux in said first and second paths are separately driven from one to another of said states, a first means linking each of said three paths for driving the flux in said first path from a first remanent state to the other remanent state, said first means causing a cancelling voltage to be produced in said output circuit as a result of a flux change in said third path, and a second means linking each of said three paths for driving said second path from said one remanent state to the other remanent state, said second means causing a cancelling voltage to be produced in said output circuit as a result of a flux change in said first path.

13. A magnetic system for producing successive symmetrical signals of opposite polarities comprising a transfluxor of substantially rectangular hysteresis loop material having a central aperture, a plurality of other apertures, three flux paths in said transfluxor, each of said flux paths being taken about a different one of said plurality of said other apertures, said material having two remanent states, means to set the flux in both said first and second paths to one of said remanent states, an output circuit linking all said paths such that said output circuit has a signal produced therein only when the flux in said first and second paths are separately driven from one to another of said states, a first means linking each of said three paths for driving the flux in said first path from a first remanent state to the other remanent state, said first means causing a cancelling voltage to be produced in said output circuit as a result of a flux change in said third path, and a second means linking each of said three paths for driving said second path from said one remanent state to the other remanent state, said second means causing a cancelling voltage to be produced in said output circuit as a result of a flux change in said first path.

14. A magnetic system comprising a plate of substantially rectangular hysteresis loop material having a plurality of apertures therein, three flux paths in said material, each of said paths being taken about a different one of said apertures, an output circuit linked to each of said paths, a different first winding linked to each of said paths, means connecting said first windings in series with each other in a first input circuit, a different second winding linking each of said paths, means connecting said second windings in series with each other in a second input circuit, a setting circuit linking a portion of said material in each of said first and second paths, and separate means for applying signals to said first and second input circuits respectively, said first winding of said second path causing a cancelling signal in said output circuit when a signal is applied to said first input circuit, said second winding of said first path causing a cancelling signal in said output circuit when a signal is applied to said second input circuit.

15. A magnetic system comprising a plate of substantially rectangular hysteresis loop material having a central aperture and three other apertures centered between the material of said central aperture and periphery of said plate, three flux paths in said magnetic material, each of said paths being defined by the material about a different one of said three apertures, an output circuit linked to each of said paths, a different first winding linked to each of said paths, means connecting said first windings in series with each other in a first input circuit, a different second winding linking each of said paths, means connecting said second windings in series with each other in a second input circuit, a setting circuit linking a portion of said material in each of said first and second paths, separate means for applying signals to said first and second input circuits respectively, said first winding of said second path causing a cancelling signal in said output circuit when a signal is applied to said first input circuit, said second winding of said first path causing a cancelling signal in said output circuit when a signal is applied to said second input circuit, and further winding means linked to said plate through said central aperture.

16. A magnetic system including a plate of substantially rectangular hysteresis loop material having a central aperture and three other apertures centered in the material between said central aperture and the periphery of said plate, three flux paths in said magnetic material, each of said three paths being defined by the material about a different one of said other apertures, an output circuit linked to each of said paths, a different first winding linked to each of said paths, means connecting said first windings in series with each other in first input circuit, a different second winding linking each of said paths, means connecting said second windings in series with each other in a second input circuit, a setting circuit linking a portion of said material in each of said first and second paths, winding means including said setting circuit linked to said material through said central aperture for applying magnetizing forces to said paths, and further winding means including first and second windings linked to the material included in two of said three paths for producing flux changes in the material of said two paths.

References Cited in the file of this patent

UNITED STATES PATENTS

| | | |
|---|---|---|
| 2,709,248 | Rosenberg | May 24, 1955 |
| 2,724,103 | Ashenhurst | Nov. 15, 1955 |
| 2,732,542 | Minnick | Jan. 24, 1956 |
| 2,733,424 | Chen | Jan. 31, 1956 |
| 2,734,185 | Warren | Feb. 7, 1956 |
| 2,802,953 | Arsenault | Aug. 13, 1957 |
| 2,803,812 | Rajchman | Aug. 20, 1957 |

OTHER REFERENCES

"The Transfluxor" (Rajchman), Proceedings of the IRE, vol. 44, pp. 321–332, March 1956.

"A Coincident-Current Memory Cell for the Storage of Digital Information" (Papian), Proceedings of the IRE, April 1952, pp. 475–478.